3,012,991
CHEMICAL REACTIONS
Heinz Schultheis and Wilhelm Kallert, Koln-Stammheim, Herbert Nordt, Leverkusen-Bayerwerk, and Detlef Delfs, Opladen, Germany, assignors, by direct and mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware
No Drawing. Filed Nov. 13, 1957, Ser. No. 696,070
9 Claims. (Cl. 260—75)

This invention relates generally to the reaction of a compound having an isocyanato group with a compound containing reactive hydrogen atoms and, more particularly, to a novel method for accelerating the reaction between an organic isocyanate with a compound containing at least one reactive hydrogen. This application is a continuation-in-part of our copending application Serial No. 541,861, filed October 20, 1955.

The term "reactive hydrogen" is used herein and in the appended claims to designate a hydrogen atom which is exchangeable or, in other words, can be replaced by an alkali metal and is determined by the Zerewitinoff method. Such hydrogen atoms are reactive with the NCO group of an organic isocyanate.

It has been proposed heretofore to react an organic isocyanate with a compound having a reactive hydrogen, such as, for example, an alcohol, a mercaptan, a primary or a secondary amine, a carboxylic acid or enol. The reaction between these two compounds can be represented by the following equation:

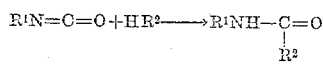

wherein $R^1$ and $R^2$ are organic radicals. It has been recognized that the reaction between an organic isocyanate and a compound having a reactive hydrogen proceeds too slowly for the reaction to be used extensively for manufacturing purposes. In order to accelerate the reaction, it has been proposed to include one or more heavy metal compounds, tertiary amines, phosphines or alkali phenates in the reaction mixture to serve as a catalyst. These heretofore available catalysts accelerate the reaction but present disadvantages which offset at least to some extent the advantage obtained through their use. For example, a heavy metal compound or a tertiary amine will accelerate an undesirable oxidation of the reactants. Moreover, tertiary amines often cause discolorations and impart an unpleasant odor to the product. There is also a danger of saponificatoin of hydrolyzed reactants when tertiary amines are used as a catalyst. Phosphines and alkali phenates sometimes fail to accelerate the reaction between the organic isocyanate and organic compound having a reactive hydrogen sufficiently to warrant the inclusion thereof in the reaction mixture.

It is, therefore, an object of the present invention to provide a catalyst for accelerating the reaction between an organic isocyanate and a compound containing at least one reactive hydrogen which is devoid of the disadvantages inherent in the heretofore available catalysts. Another object of the invention is to provide a method for reacting an organic isocyanate with a compound containing reactive hydrogen wherein a catalyst which is harmless and does not cause side reactions is used. A further object of the invention is to provide a method for making compounds by reacting an organic isocyanate with a compound containing reactive hydrogen at an accelerated rate without adverse effect on the finished product. One of the more specific objects of the invention is to provide an improved method of preparing polyurethanes. Still other objects will become apparent from the following description.

Generally speaking, the foregoing objects as well as others are accomplished in accordance with this invention by providing a method for reacting an organic isocyanate with a compound containing reactive hydrogen while in admixture with a substituted gamma-pyrone. The invention, thus, contemplates a novel process for making the addition products of an organic isocyanate with a compound containing reactive hydrogen and a novel catalyst for accelerating the reaction between such compounds. It has been found that even small amounts of a substituted gama-pyrone will appreciably accelerate the reaction between an organic isocyanate and a compound containing reactive hydrogen. On the other hand, alpha-pyrones and unsubstituted gamma-pyrones do not accelerate the reaction appreciably. Moreover, homologues with condensed nuclei, such as the chomones, are unsuitable for the purpose.

Any suitable substituted gamma-pyrone may be included in the reaction mixture and will accelerate the reaction between the organic isocyanate and the compound containing reactive hydrogen. Examples of such compounds include 2,6-dimethyl pyrone-4; 2,6-diphenyl pyrone-4; 3,5-dibromo-2,6-dimethyl pyrone-4; 2',6'-dibenzylidene-2,6-dimethyl pyrone-4; 2',6'-difurfurylidene-2,6-dimethyl pyrone-4; 3,5-diphenyl pyrone-4; 3-methyl pyrone-4; 3-ethyl pyrone-4; 3-bromo-2,6-dimethyl pyrone-4; 2,3,5,6-tetramethyl pyrone-4; 2-methyl-6-phenyl pyrone-4; 2-ethyl-6-phenyl pyrone-4; 2,6-dimethyl-3-ethyl pyrone-4; pyrone-4 2,6-dicarboxylic acid, 2-phenyl pyrone-4 carboxylic acid ethyl ester-6. It is apparent from the foregoing examples that any suitable gamma-pyrone containing at least one organic radical substituted for a hydrogen atom on a carbon atom on the ring of the pyrone may be used. Hence, a process embodying a reaction of any organic isocyanate with any compound having reactive hydrogen in the presence of any suitable gamma-pyrone is within the purview of this invention.

Any suitable amount of substituted gama-pyrone may be included in the reaction mixture and the optimum amount of catalyst for a particular chemical reaction may vary somewhat depending upon the reaction rate desired. The invention, thus, contemplates a chemical reaction between an organic isocyanate and any compound containing active hydrogen wherein any suitable amount of any suitable substituted gamma-pyrone is used as a catalyst. In general, however, preferably from about 0.01 part by weight to about 10 parts by weight of the substituted gamma-pyrone per 100 parts by weight of the compound containing reactive hydrogen should be used in the reaction mixture. Even more preferably, the amount of substituted gamma-pyrone included in the reaction mixture should be from about 0.1 to about 1 part by weight of the substituted gamma-pyrone per 100 parts by weight of the compound containing reactive hydrogen in the reaction mixture.

In practicing the invention, the substituted gamma-pyrone may be mixed with the reactants by any suitable method. The substituted gamma-pyrone may be added to a mixture of organic isocyanate and compound containing reactive hydrogen or it may be added to one of the reactants before it is mixed with the other reactant to form the reaction mixture. Any suitable mixing apparatus may be used, for example, the apparatus disclosed in the Hoppe et al. Patent 2,764,565 may be used to advantage for bringing the catalyst and reactants together.

The reaction between the organic isocyanate and the compound containing reactive hydrogen may be conducted by any suitable known procedure and at any of the conventional temperatures used in bringing about such reactions. The catalyst provided by this invention will accelerate the reaction rate between the organic isocyanate and the compound containing reactive hydrogen at any given temperature over the reaction rate of the same reactants at the same temperature but without the catalyst.

As pointed out hereinbefore, the substituted gamma-pyrones accelerate the reaction between any organic isocyanate either a mono-isocyanate or a polyisocyanate, and any organic compound containing reactive hydrogen. Examples of suitable isocyanates include 2,4-toluylene diisocyanate, 2,6-toluylene diisocyanate, para-phenylene diisocyanate, 4,4'-diphenylmethane diisocyanate, tetramethylene diisocyanate, hexamethyl diisocyanate, $\omega,\omega'$-dipropylether diisocyanate, cyclohexane-1,4-diisocyanate, dicyclohexylmethane - 4,4' - diisocyanate, diphenyl dimethylmethane - 4,4' - diisocyanate, 1 - methyl - benzene-2,4,6 - triisocyanate, 1 - methyl - 3,5 - diethylbenzene-2,4,6-triisocyanate, phenyl isocyanate, methyl isocyanate, ethyl isocyanate, and the like, or any polyisocyanate prepared by chemical reaction between a polyhydric alcohol and an organic diisocyanate having unreacted isocyanata groups. Compounds which upon heating react like a polyisocyanate may be used in lieu of one of the foregoing isocyanates, if desired. Dimeric arylene diisocyanates or polymerization products of polyisocyanates are examples of such compounds. Still other examples of suitable isocyanates are the isocyanate-modified polyesters or polyalkylene ether glycols prepared by reaction between a polyester or polyalkylene ether glycol with an excess of an organic polyisocyanate over that required to react with the reactive hydrogen atoms.

As indicated hereinbefore, any compound containing reactive hydrogen atoms as determined by the Zerewitinoff method may be used for reaction with the organic isocyanate in the presence of the substituted gamma-pyrone. Examples of such compounds include the alcohols, polyhydric alcohols, mercaptans, compounds containing an amino group, carboxylic acids, enols, condensation products of polycarboxylic acids and polyhydric alcohols, such as hydroxyl terminated polyesters, polyesteramides, polyalkylene ether glycols or the like. Of this class of compounds, polyhydroxy compounds, such as, for example, polyesters having terminal hydroxyl groups and polyalkylene ether glycols prepared by condensation of an alkylene oxide, such as ethylene or propylene oxide, are preferred for making polyurethanes in accordance with this invention. Preferably, these compounds have a molecular weight of at least about 1,000, an hydroxyl number of not more than about 112, and the polyester has an acid number of from 0 to about 2.

In order better to describe and further clarify the invention, the following are specific examples thereof.

*Example 1*

About 20 grams of cyclohexanol and about 20 g. of chlorobenzene are mixed with about 24 g. of phenyl isocyanate at a temperature of about 22° C. in a flask equipped with a stirrer. Stirring is stopped after about one minute. The flask is mounted in a thermostat and a temperature/time curve is taken as a standard, representing the temperature on the *y*-axis and the corresponding times on the *x*-axis of a coordinate system.

The experiment is repeated under the same conditions but with addition of about 0.8 g. of 2,6-dimethyl-pyrone-4. From the following table, in which the results are indicated, it may be seen that the presence of the pyrone causes a quicker temperature rise.

| | Mixture containing 2,6-dimethyl-pyrone-4, degrees centigrade | Test mixture without accelerating additive, degrees centigrade |
|---|---|---|
| at starting point | 22 | 22 |
| after 4 minutes | 58 | 50 |
| after 7 minutes | 85 | 75 |
| after 10 minutes | 94 | 86 |

*Example 2*

Following the procedure described in Example 1, the amount of pyrone to be used in any given case may easily be determined in a set of preliminary experiments, taking the temperature rise and the time required therefor as a measure of the accelerating effect.

Thus, when mixing about 600 grams of an hydroxyl polyester obtained from about 333 g. of adipic acid and about 272.5 g. of diethylene glycol and characterized by having an hydroxyl number of about 59.2 and an acid number of about 0.85 with about 60 g. of 2,4-toluylene diisocyanate in the absence of an accelerator, a rise in temperature from about 80° to about 85.9° C. occurs within about 15 minutes. On the other hand, a temperature rise from about 80° to about 91.9° C. takes place within about 10 minutes if the experiment is carried out in the presence of about 2.4 g. of 2,6-dimethyl-pyrone-4, other conditions being the same.

When mixing about 400 g. of a linear polyether prepared from ethylene oxide and characterized by having an hydroxyl number of about 117 with about 112 g. of 4,4'-diphenyl-methane diisocyanate at a temperature of about 85° C., the temperature rises to about 97° C. within about 12 minutes. If the same experiment is repeated with addition of about 2.5 g. of 2',6'-dibenzylidene-2,6-dimethyl-pyrone-4, the temperature rises to about 104° C. within about 6 minutes.

*Example 3*

About 90 grams of 1,5-naphthylene diisocyanate are mixed by stirring at about 126° C. with about 500 g. of a polyester prepared from about 1.1 mol of ethylene glycol and about 1 mol of adipic acid, said polyester having terminal hydroxyl groups and an OH number of about 56. After about 10 minutes, the temperature of the reaction mixture does not rise any more, that is to say, the reaction is practically complete. A solution of about 2 g. of 2,6-dimethyl-pyrone-4 in about 10 g. of 1,4-butylene glycol is mixed by stirring with the reaction mixture and the mass is poured into waxed molds which are heated to about 110° C. A standardized molded element can be removed after about 15 minutes. Without using 2,6-dimethyl-pyrone-4, the solidification takes about 30 minutes.

A highly elastic material is obtained which exhibits excellent mechanical properties, such as tear resistance, abrasion loss and fastness to ozone, oil, benzene and other organic solvents.

*Example 4*

About 500 grams of a polyester prepared from about 1 mol of adipic acid and about 1.1 mol of ethylene glycol, which polyester has terminal hydroxyl groups and an OH number of about 56, are heated to about 126° C. and mixed with about 3 g. of 2,6-dimethyl-pyrone-4. About 90 g. of 1,5-naphthylene diisocyanate are then added while stirring. The reaction is terminated after about 6 minutes (instead of about 10 minutes without 2,6-dimethyl-pyrone-4, see Example 3), that is to say, the temperature does not rise any longer. After about 10 g. of 1,4-butylene glycol have been added with stirring, the mixture can be poured into waxed molds. The viscosity of the reaction product is as low and the molding time is as long (about three minutes) as in the absence of 2,6-dimethyl-pyrone-4, but the solidification then taking place permits a standardized molded element to be recovered already after about 10 minutes. In contrast thereto, solidification takes about 30 minutes when 2,6-dimethyl-pyrone-4 is not added.

The rubber-like product thus obtained can be used, for instance, for heels, soles, buffers for cars, balls, bottle rings, and foot rests.

*Example 5*

In a preliminary test a batch of a polyester prepared from adipic acid and ethylene glycol is found to react too slowly, the rise in temperature when reacted with 1,5-naphthylene diisocyanate being complete only in about 14 minutes and a sample cross-linked with 1,4-butylene glycol solidifying only after about 45 minutes. When about 0.2% of 2,6-diphenyl-pyrone-4 is mixed with this batch, the reaction with 1,5-naphthylene diisocyanate proceeds much more rapidly, that is to say, the reaction is complete after about 9 minutes, and a standardized molded element cast after cross-linking with 1,4-butylene glycol can be removed from the mold after about 25 minutes. An elastic material is thereby obtained which can be used, for instance, for plates, pipes, cylinders, rings, elastic structural parts for machines and coverings for ball mills.

*Example 6*

About 203 grams of 1,4-phenylene diisocyanate are added at a temperature of about 115° C. to about 1500 grams of a polythioether prepared from about 1 mol of thiodiglycol and about 1 mol of 1,4-butylene glycol and characterized by having an OH number of about 56. After about 6 minutes the reaction is complete, temperature not rising any longer. Now a solution of about 4.8 g. of 2',6'-difurfurylidene-2,6-dimethyl-pyrone-4 in about 30 g. of 1,4-butylene glycol is added to the reaction mixture which is then poured into waxed molds heated to about 110° C. The solidification taking place permits a standardized molded element to be recovered already after about 12 minutes. The solidification takes about 30 minutes when 2',6'-difurfurylidene-2,6-dimethyl-pyrone-4 is not added.

The molded element shows rubber-like properties with excellent tear resistance, abrasion loss, and an absolute resistance to oil, benzene, and ozone.

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What is claimed is:

1. A method for making a urethane which comprises reacting an organic isocyanate with an organic compound having at least one reactive hydrogen atom determinable by the Zerewitinoff method while in admixture with a catalytic amount of a gamma-pyrone having as a substituent at least one member selected from the group consisting of lower alkyl radicals, aryl radicals, aralkyl radicals, hetero cyclic radicals containing oxygen, carboxyl groups and carboxylic acid ester groups.

2. The method of claim 1 wherein the gamma-pyrone is substituted with a lower alkyl radical.

3. The method of claim 1 wherein the gamma-pyrone is 2,6-diphenyl-pyrone-4.

4. The method of claim 1 wherein the pyrone is 2',6'-dibenzylidene-2,6-dimethyl-pyrone-4.

5. The method of claim 1 wherein the gamma-pyrone is 2,6-dimethyl-pyrone-4.

6. The method of claim 1 wherein the gamma-pyrone is 2',6'-difurfurylidene-2,6-dimethyl-pyrone-4.

7. A method for making a polyurethane which comprises reacting an organic polyisocyanate with an organic compound having at least two reactive hydrogen atoms determinable by the Zerewitinoff method and having a molecular weight of at least about 1,000, an hydroxyl number of not more than about 112 and an acid number of from zero to about 2, while in admixture with a catalytic amount of a gamma-pyrone having as a substituent at least one member selected from the group consisting of lower alkyl radicals, aryl radicals, aralkyl radicals, hetero cyclic radicals containing oxygen, carboxyl groups and carboxylic acid ester groups.

8. The method of claim 7 wherein the gamma-pyrone is 2,6-dimethyl-pyrone-4.

9. The process of claim 7 wherein the said organic compound having reactive hydrogens is selected from the group consisting of a polyester prepared by esterification of a polycarboxylic acid and a polyhydric alcohol, a poly-(alkylene ether) glycol and a polythioether glycol.

References Cited in the file of this patent

UNITED STATES PATENTS

| | | |
|---|---|---|
| 2,374,136 | Rothrock | Apr. 17, 1945 |
| 2,622,987 | Ratcliffe | Dec. 23, 1952 |
| 2,634,244 | Simon et al. | Apr. 7, 1953 |
| 2,650,212 | Windemuth | Aug. 25, 1953 |
| 2,729,618 | Muller et al. | Jan. 3, 1956 |
| 2,730,518 | Birley et al. | Jan. 10, 1956 |

OTHER REFERENCES

Saunders et al.: "Chemical Reviews," vol. 43, 1948, pp. 203–218.